United States Patent [19]

Iwasaki

[11] Patent Number: 5,589,888
[45] Date of Patent: Dec. 31, 1996

[54] YC SEPARATION AND STILL PICTURE REPRODUCING CIRCUIT

[75] Inventor: Kiyoshi Iwasaki, Tokyo, Japan

[73] Assignee: NEC Corporation, Tokyo, Japan

[21] Appl. No.: 504,503

[22] Filed: Jul. 20, 1995

[30] Foreign Application Priority Data

Jul. 22, 1994 [JP] Japan ................................. 6-170934

[51] Int. Cl.$^6$ ...................................................... H04N 9/78
[52] U.S. Cl. .......................... 348/669; 348/604; 348/670
[58] Field of Search ....................................... 348/663, 604, 348/669, 665, 670, 449–452; 358/31; H04N 9/64, 9/77, 9/78

[56] References Cited

U.S. PATENT DOCUMENTS 5,155,582 10/1992 Tokoi ...................................... 348/663
5,339,113 8/1994 Iwasaki .................................. 348/669

*Primary Examiner*—Sherrie Hsia
*Attorney, Agent, or Firm*— Foley & Lardner

[57] ABSTRACT

Two field memories for supplying a composite video signal of a previous frame to a motion detector are provided in performing a three dimensional Y/C separation. An output of the field memory connected to an input terminal is connected to a two dimensional Y/C separator by a switching circuit when there is a request for a function employing a field memory. When there is no such request, the input terminal is connected to the two dimensional Y/C separator. When there is a request for a still reproducing function employing a field memory, the function is realized by using the field memory employed in a three dimensional Y/C separation.

20 Claims, 3 Drawing Sheets

YC SEPARATION AND STILL PICTURE REPRODUCING CIRCUIT

BACKGROUND OF THE INVENTION

The present invention relates to a video signal processor for processing a video signal by separating a luminance signal (Y) and a chroma signal (C) in a three dimensional manner (hereinafter referred to 3D Y/C separation), and in particular, to a video signal processor for processing a nonstandard signal of a laser disk player or a video tape recorder.

DESCRIPTION OF THE RELATED ART

Recently, various video signal processors, such as a laser disk player (LDP), a video tape recorder (VTR) and a television (TV), are required to have higher picture quality and function. In order to obtain a higher picture quality, separating a luminance signal (Y) and a chroma signal CO) between scanning lines (hereinafter referred to a Y/C separation between lines), that is, a Y/C separation in a two dimensional manner (hereinafter referred to a 2D Y/C separation) is performed at a part of a moving video signal, and as for a part of a still video signal, a 3D Y/C separation is performed between frames, and also, a scanning line interpolation is conducted to calculate a mean value of signals from present and previous scanning lines for using it as a scanning line interpolation signal. Further, for achieving a higher function, there is realized a still reproduction in which a picture is stopped at a scene to be displayed, and also, a stroboscopic action in which a screen stopped at a constant interval is switched to be displayed.

In order to achieve higher picture quality and function, one or more field memories are needed, the field memory storing at least one field data (one field is one half of a frame, i.e., half signal for a screen). For example, there is shown in FIG. 1 a video signal processor equipped with a three dimensional Y/C separation function for a higher picture quality and a still reproducing function for a higher function.

The video signal processor includes an input terminal 101 to which a composite video signal is inputted. A still field memory 104 and a standard/nonstandard detecting circuit 107 for outputting a control signal 201 are connected to the input terminal 101. A 2D Y/C separating circuit 111 and a field memory 108 for motion detection are connected to an output of the still field memory 104. A field memory 109 for motion detection is connected to an output of the motion detect field memory 108. A motion detecting circuit 110 for outputting a control signal 207 is connected to an output of the still field memory 104 and an output of the field memory 109. A key input detecting circuit 106 detects a keying signal 212 from a keying circuit (not shown) and outputs the result detected as a control signal 202. The control signal 202 from the key detector 106, the control signal 201 from the standard/nonstandard detector 107, and the control signal 207 from the motion detector 110 are inputted to a controller 105.

The controller 105 outputs a control signal 203 to the still field memory 104 and control signals 204, 205 to the motion detect field memories 108, 109 respectively. subtracting circuit 112 executes a subtraction between an output of the still field memory 104 and an output of the motion detect field memory 109. A switching circuit 114 switches an output from the subtractor 112 and an output from the 2D Y/C separator 111 according to a control signal 206 from the controller 105 and outputs one of them to a color signal output terminal 103. A subtracting circuit 113 executes a subtraction between the output of the still field memory 104 and an output of the switching circuit 114 and outputs a luminance signal to a luminance signal output terminal 102.

The operation of the video signal processor is described hereinafter. A composite video signal inputted to the input terminal 101 is delivered to the still field memory 104 and the standard/nonstandard detector 107. The standard/nonstandard detector 107 detects whether the composite video signal inputted is a standard signal or a nonstandard signal and outputs the result to the controller 105 as a control signal 201. If the composite signal is a standard signal such as a TV broadcasting signal or a normal playing signal of a LDP, tile signal is sent to the first and the second motion detect field memories 108, 109 through the still field memory 104. The motion detector 110 detects a difference between a composite video signal of a previous frame and the present signal by using the signals stored in the memories 108, 109 according to control signals 204, 205 from the controller 105. It is defined a moving picture if the difference is more than the predetermined value and is defined a still picture if less than the value. The motion detector 110 outputs this result to the controller 105 as a control signal 207.

If a moving picture is detected, the switching circuit 114 is controlled by a control signal 206 from the controller 105 and the 2D Y/C separator 111, which performs a Y/C separation between lines, is connected to the video signal output terminal 108. That is, a chroma or color signal is separated from the composite signal by the 2D Y/C separator 111. The subtractor 113 separates a luminance signal by subtracting the chroma signal from the composite signal and outputted the luminance signal to the luminance signal output terminal 102. On the other hand, if a still picture is detected by comparing the previous composite signal and the present signal, the switching circuit 114 is controlled by a control signal 206 from the controller 105 and the subtractor 112 which performs a Y/C separation between frames, is connected to the chroma signal output terminal 108. When executing an interframe Y/C separation, there is performed a subtraction between a composite video signal of a previous frame (Y–C) and the present signal (Y+C) by the subtractor 112 to separate a chroma signal 2C. Here, Y and C represent a luminous signal and a chroma signal, respectively, and the chroma signal reverses polarity for every frame. Likewise in the case of moving picture, a luminous signal is separated by subtracting a chroma signal from a composite signal with the subtractor 113.

Further, if the composite video signal detected is a VTR playing-back signal or a searching or still video signal of LDP, that is, a nonstandard signal, a Y/C separation cannot be performed between frames since either one of a color subcarrier frequency, a horizontal scanning frequency or a vertical scanning frequency of the composite signal, or, all of these frequencies differ from their normal values. In other words, an image point of a previous frame would not correspond to the same coordinate point in the present picture due to a difference in their frequencies, and thus, a precise calculation (interframe Y/C separation) cannot be performed to obtain a precise picture. Therefore, when the composite video signal is a nonstandard signal, similar to the case of a standard signal and a moving picture, the composite signal is separated into a luminance signal and a chroma signal by the 2D Y/C separator 111 which executes a Y/C separation between scanning lines.

If the key detetor 106 detects a request for a still reproduction from a keying signal, the key detector 106 transmits this request to the controller 105 by a control signal 202. The controller 105, on receiving the control signal 202, stops writing to the still field memory 104 with a control signal 208 and keeps outputting the composite signal held in the still field memory 104. Further, since the composite signal in a still reproduction is nonstandard signal, the controller 105 causes the switching circuit 114 to choose an output from the 2D Y/C separator 111 by delivering a control signal 206. In other words, when a keying signal indicates a request for a still reproducing function, the composite video signal stored in the still field memory 104 is outputted, and the two dimensional Y/C separator 111 separates this composite signal into a chroma signal and a luminance signal employed in performing a still reproduction.

In this way, a function employing a field memory for a still reproduction is realized in a video signal processor performing a three dimentional Y/C separation.

However, with the above conventional apparatus, a field memory having one frame capacity, that is, a field memory or memories having two fields capacity is required to execute a three dimentional Y/C separation. To realize a function employing a field memory for a still reproduction, an additional field memory having one field capacity is necessary. As a result, a field memory having three-field capacity is required in order to add a function employing a field memory for a still reproduction in a video signal processor performing a three dimentional Y/C separation, and this makes the system large in size and expensive.

SUMMARY OF THE INVENTION

In a video signal processor for performing a three dimensional Y/C separation according to the present invention, the two motion detect field memories are regarded. In the conventional apparatus, the two memories are used for a motion detection and an interframe Y/C separation when a standard signal is inputted and the two memories are not used when a nonstandard signal is inputted or a function only for executing a 2D Y/C separation such as a still reproduction is requested. According to the present invention, when there is a request for a still reproducing function employing a field memory, the motion detect field memories not used are used as field memories for realizing a still reproducing function. It is therefore an object of the present invention to provide a video signal processor for realizing the function without having an additional field memory.

To achieve the object, there is provided a video signal processor comprising a means for performing a 2D Y/C separation between scanning lines for a video signal inputted, a first field memory, a second field memory, a means for performing an interframe 3D Y/C separation using a video signal inputted and video signals outputted from the first and the second field memories, a means for detecting whether a video signal inputted is a standard signal or a nonstandard signal, a means for detecting a motion of a picture by comparing a composite video signal inputted with a composite video signal of a previous frame, a first switching means for switching between an output of the 2D Y/C separating means and an output of the 3D Y/C separating means depending on an output of the standard/nonstandard detecting means and an output of the motion detecting means and a second switching means for connecting an output of the first field memory to the 2D Y/C separating means when a function employing a field memory is requested.

According to an aspect of the invention, the video signal processor further comprises a means for detecting a key input, in which the key input detecting means detects a request for the function employing a field memory.

According to another aspect of the invention, the video signal processor further comprises an input terminal to which a composite video signal is inputted, a chroma signal output terminal connected to an output of the first switching means, a luminance signal separating means connected to the input terminal and to the first switching means for separating a luminance signal from a composite signal inputted and a luminance signal output terminal connected to an output of the luminance signal separating means.

According to another aspect of the invention, the video signal processor further comprises a first control means, in which the first control means stops a writing to the first field memory when the function employing the field memory is requested.

According to another aspect of the invention, the video signal processor further comprises a third switching means, in which the third switching means prevents a video signal inputted from inputting to the first field memory when the nonstandard signal is detected.

According to another aspect of the invention, the video signal processor further comprises a fourth switching means, in which the fourth switching means prevents a video signal inputted from inputting to the motion detecting means when the function employing the field memory is requested.

According to another aspect of the invention, the video signal processor further comprises a second control means for controlling the first switching means, in which the second control means switches the first switching means depending on an output of the key input detecting means and an output of the motion detecting means.

According to another aspect of the invention, the 3D Y/C separating means includes a subtractor.

According to another aspect of the invention, the second controlling means includes an OR circuit.

According to another aspect of the invention, the luminance signal separating means includes a subtractor.

According to the invention, therefore, two motion detect field memories employed in an interframe Y/C separation and a motion detection are used as field memories to realize a still reproducing function when a standard signal is inputted. As a result, a system can be configured without having an additional field memory, and a function employing a field memory for a still reproduction can be realized with a compact system configuration low in cost.

BRIEF DESCRIPTION OF THE DRAWINGS

The objects, features and advantages of the present invention will become more apparent from the consideration of the following detailed description taken in conjunction with the accompanying drawings in which.

DESCRIPTION OF THE PREFERRED EMBODIMENTS

Figure 1:
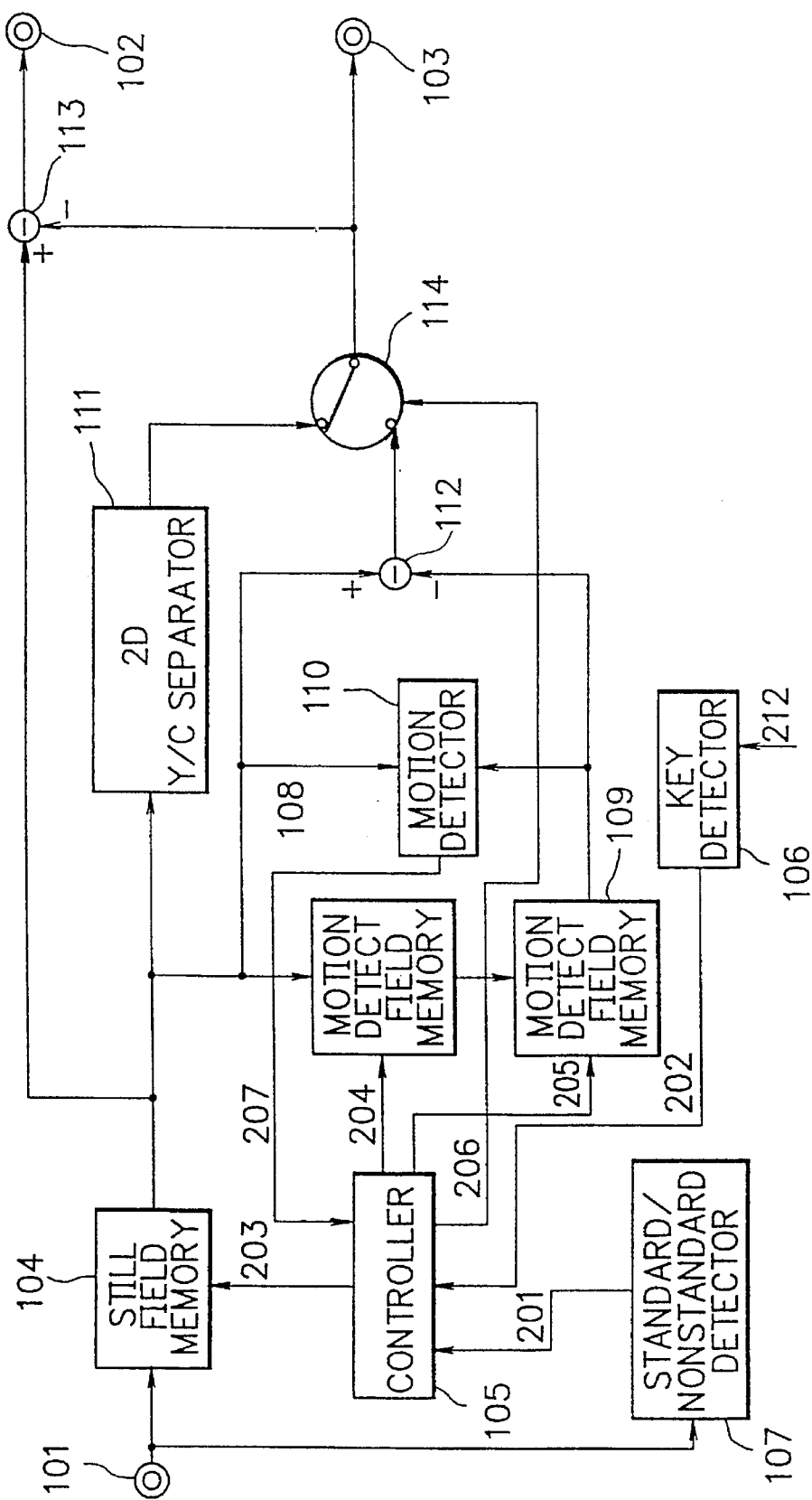
FIG. 1 is a block diagram illustrating a conventional video signal processor.

Referring now to the drawings, description will be made in detail of embodiments of a video signal processor according to the present invention.

Figure 2:
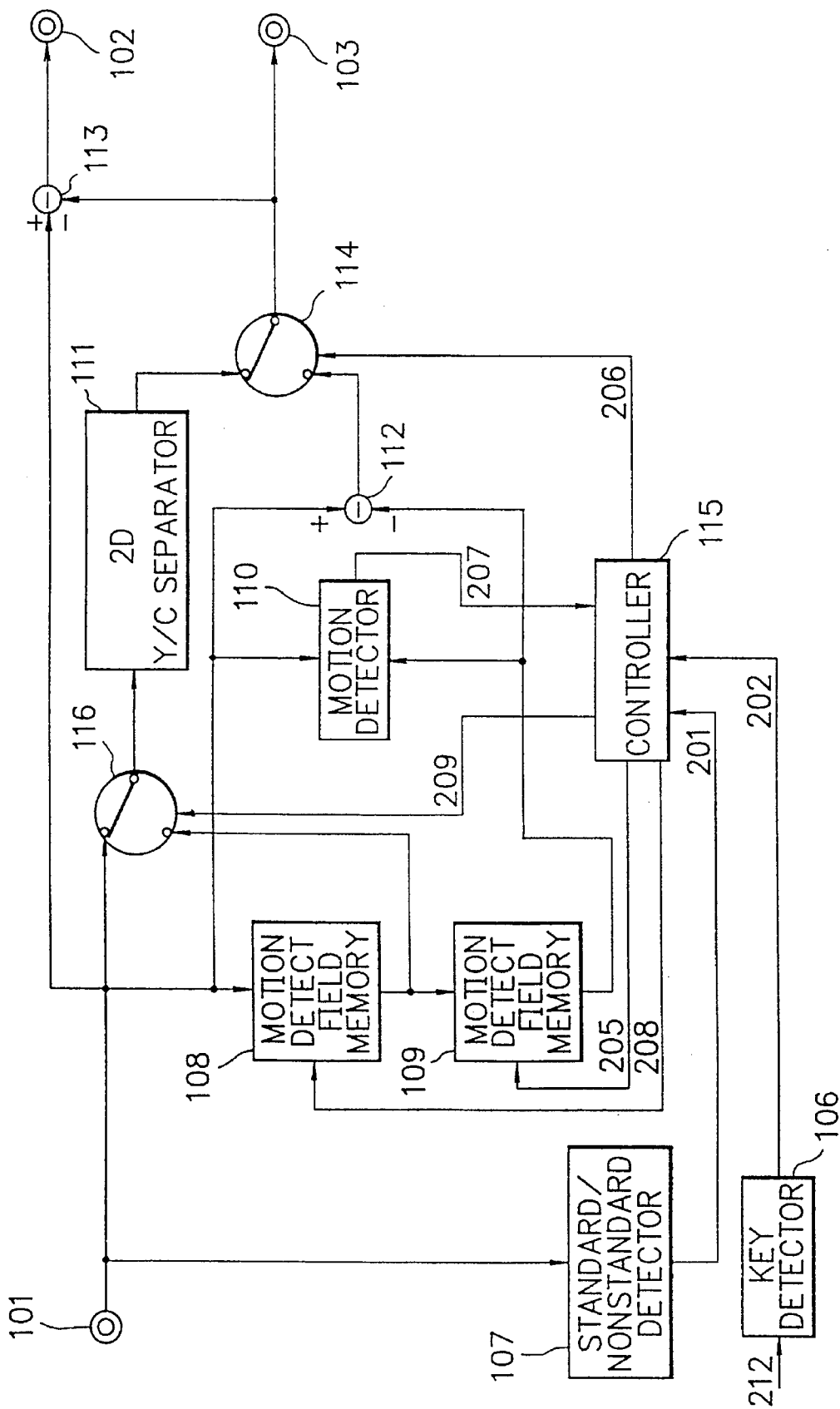
FIG. 2 is a block diagram illustrating a first embodiment according to the present invention.

FIG. 2 shows a first embodiment of a video signal processor according to the present invention. The video signal processor comprises an input terminal 101 from which a composite video signal is inputted. A standard/nonstandard detector 107 is connected to the input terminal 101. The motion detect field memory 108 is connected to the input terminal 101 and receives a control signal 208. A field memory 109 has its input connected to an output of the field memory 108 and receives a control signal 205. Inputs of a motion detector 110 are connected to the input terminal 101 and to an output of the field memory 109. A key detector 106 detects a still reproduction request depending on a keying signal 212 and outputs a control signal 202. A 2D Y/C separator 111 is connected to an output of a switching circuit 116. The switching circuit 116 selectively connects either of an output of the field memory 108 and the input terminal 101 to an input of the 2D Y/C separator 111 depending on a control signal 209. Outputs from the input terminal 101 and the field memory 109 are fed to both inputs of a subtractor 112 so that the subtractor 112 executes a subtraction. A switching circuit 114 selectively connects outputs from the 2D Y/C separator 111 and the subtractor 112 to a chroma signal output terminal 103 depending on a control signal 206. Controller 115 is connected to outputs from the key detector 106, the standard/nonstandard detector 107 and the motion detector 110 provides control signals 208, 205, 209 and 206 to the field memories 108, 109, the switching circuit 116 and the switching circuit 114, respectively. A subtractor 113 has its inputs connected to the switching circuit 114 and to the input terminal 101 for receiving signals therefrom, and after subtracting the signals, outputs the result to a luminance signal output terminal 102.

According to the video signal processor of the present invention, when a standard signal is inputted as a composite signal, the standard/nonstandard detector 107 detects it as a standard signal and inputs the result detected to the controller 115 as a control signal 201. The controller 115 with the control signal 201 inputted transmits a control signal 209 to the switching circuit 116 and connects the input terminal 101 to the 2D Y/C separator 111. If a composite signal inputted to the input terminal 101 is a standard signal and the key detector 106 detects no function, similar to the conventional art described in FIG. 1, the output of the 2D Y/C separator 111 is connected to a chroma signal output terminal 103 in dependence on the control signal 206 when the motion detector 110 detects the standard signal as a moving picture, and likewise, the output of the subtractor 112 is connected to the chroma signal output terminal 103 when a still picture is detected. Further, when the key detector 106 detects a request for a function employing a field memory for a still reproduction, the same composite signal goes through a three dimensional Y/C separation since a stored composite signal having one field capacity is used in a still reproduction. However, only a two dimensional Y/C separation can be performed for the composite signal since the still composite signal is a nonstandard signal. Therefore, when a request for a still reproduction is detected by the key detector 106, the switching circuit 116 is controlled by the control signal 209 and the input terminal 101 is switched to be connected to the 2D Y/C separator 111.

When a nonstandard signal is inputted as a composite video signal, the standard/nonstandard detector 107 detects it as a nonstandard signal, and the result detected is inputted to the controller 115 as a control signal 201. The controller 115 in accordance with the control signal 201 inputted controls the switching circuit 114 in accordance with the control signal 206 and connects the two dimensional Y/C separator 111 to the chroma signal output terminal 103. At that time, when the key detector 106 detects no function, the inputted nonstandard composite signal is applied of a interframe Y/C separation by the 2D Y/C separator 111 and a chroma signal is outputted both to the chroma signal output terminal 103 and to the subtractor 113. The subtractor 113 outputs a luminance signal obtained after subtracting the chroma signal from the composite signal to the luminance signal output terminal 102. On the other hand, when the key detector 106 detects in the keying signal 212 a request for a function employing field memory for a still reproduction, the controller 115 controls the switching circuit 116 so that the output from the field memory 108 is connected to the input of the two dimensional Y/C separator 111, and outputs a control signal 208 to the field memory 108 so that rewriting of the composite signal stored in the field memory 108, that is, an update is stopped. As described, by controlling the writing to the field memory 108 by the control signal 208, when there is a request for a function employing a field memory, the field memory 108, which is used for a motion detection or an interframe Y/C separation in response to an input of a standard signal, is utilized as a still reproducing field memory. As a result, a still reproducing function is realized without employing an additional field memory.

Figure 3:
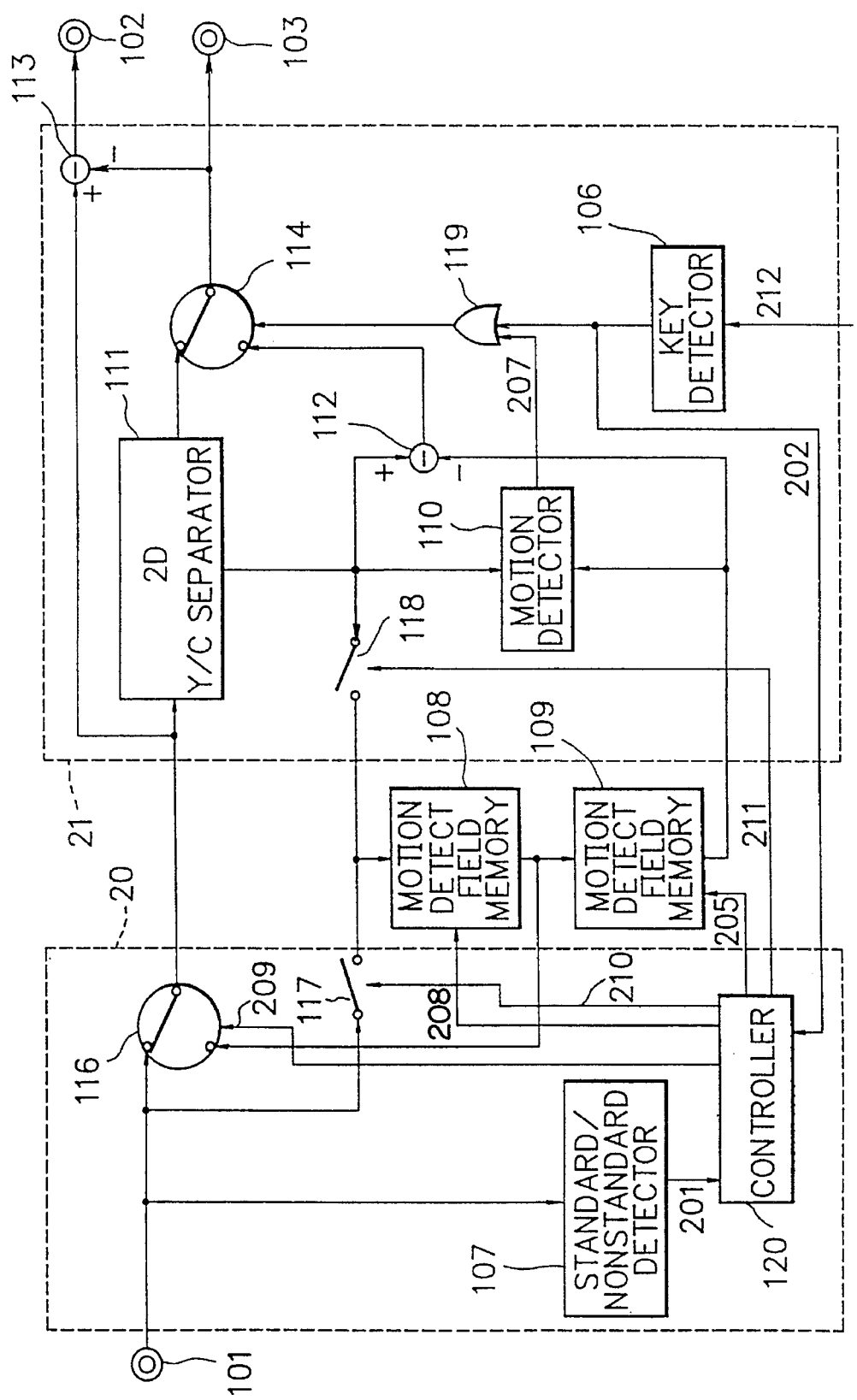
FIG. 3 is a block diagram illustrating a second embodiment according to the present invention.

A second embodiment of the present invention is shown in FIG. 3. Descriptions of the same circuits as those indicated at the same numerals in FIG. 2 are omitted.

The second embodiment is basically equivalent to the above-mentioned embodiment of FIG. 2, except that it is divided into blocks, that is, a 3D Y/C separation block 21, a control block 20 and field memories 108, 109. The 3D Y/C separation block 21 has been used conventionally, but the embodiment differs from the first embodiment shown in FIG. 2 in the following points. A switching circuit 114 for selecting outputs from a two dimensional Y/C separator 111 and from a subtractor 112 which executes a Y/C separation between frames is controlled by outputs from a key detector 106 and from a motion detector 110 through an OR circuit 119. A composite video signal of a previous frame to a motion detector 110 is connected to an input of a switching circuit 116 in the control block 20 and is controlled by a control signal 209 outputted from a controller 120.

the composite video signal provided as an input to switching circuit 116 is also provided to the motion detect field memory 108 via switch 117.

Further, a composite signal transmitted as an output of the switching circuit 116 is inputted to the 2D Y/C separation circuit 111, which provides a 2-line delayed non-separated composite signal to the motion detect field memory 108 via switch 118. The switch 118, placed in the 3D Y/C separation block 21 and connected between the 2D Y/C separation circuit 111 and the motion detect field memory 108, is controlled by a control signal 211 from a controller 120 in the control block 20. The switch 117, placed in the control block 20, is connected between an input terminal 101 and the motion detect field memory 108. The switch 117 is controlled by a control signal 210. An output from the motion detect field memory 108 is connected to the other input of the switching circuit 116. With this configuration, the controller 120 controls the switching circuit 116 with a control signal 209 so that the input terminal 101 is connected to the 2D Y/C separator 111 when a standard composite signal is inputted. And further, the controller 120 outputs a control signal 211 so that the switch 118 is conducted.

At that time, when the key detector 106 detects a request for a function employing a field memory, the switch 117 is made conductive and the switch 118 is made non-conductive by the controller 120. Furthermore, the controller 120 controls the switching circuit 116 to connect an output from the motion detect field memory 108 to the 2D Y/C separator 111. On the other hand, when a nonstandard composite signal is inputted, the controller 120 controls the switching circuit 116 so that the 2D Y/C separator 111 is connected to the input terminal 101. Further, the switch 118 is made conductive and the switch 117 is made non-conductive by the controller 120. At that time, when the key detector 106 detects a request for a still reproduction, the switching circuit 116 connects an output from the motion detect field memory 108 to the two dimensional Y/C separator 111 in response to a control signal 209 from the controller 120, and the switch 117 is made conductive and the switch 118 is made non-conductive. Now, a composite video signal is being supplied to the motion detect field memory 108 by the switch 117, but the writing to the memory 108 is controlled by a control signal 208 from the controller 120. Therefore, when there is a request for a still reproducing function, a writing of a composite signal to the motion detect field memory 108 is stopped. Moreover, when there is a request for a stroboscopic (frame feeding) function, the contents of the motion detect field memory 108 is rewritten with predetermined intervals by receiving a control signal 208 to realize the function. As described, just by adding a control block 20 to the 3D Y/C separation block 21 and the motion detect field memories 108, 109, the motion detect field memories 108, 109 used in a 3D Y/C separation can be commonly used in a function requiring a field memory. The switch 118 is equipped in the 3D Y/C separation block 21 in this embodiment, but instead, it can be placed within the control block 20 if problems such as a time delay of a composite signal does not occur.

In the embodiments, still reproducing and stroboscopic functions are taken as examples to explain the improved function. However, as long as it is a function employing a field memory, it can be other than the still reproducing function. Moreover, not only a function of a common field memory, but a function requiring two field memories, that is, one frame capacity, can be realized in the same manner.

Further, the present invention is applicable to LDP, VTR, TV and the other apparatus as long as the apparatus is equipped with a video signal processor for receiving a composite video signal and is in need of a higher function.

As described, according to a video signal processor according to the present invention, a field memory employed for a 3D Y/C separation and a field memory employed for realizing a still reproducing function are commonly used. Consequently, memory capacity is reduced and this enables an application of an additional function in a small area, and the video signal processor can be configured low in cost even with the additional function.

While the present invention has been described with reference to the particular illustrative embodiment and partial modification thereof, it is not to be restricted by them but only by the appended claims. It is to be appreciated that those skilled in the art can change or modify the embodiments without departing from the scope and spirit of the present invention.

What is claimed is:

1. A video signal processor comprising:

2D Y/C separation means for performing a 2D Y/C separation between scanning lines for a video signal received as input;

a first field memory having an input for receiving the video signal and an output;

a second field memory having an input for receiving the output from the first field memory and an output;

3D Y/C separation means for performing an interframe 3D Y/C separation using said video signal and the output from the second field memory;

standard/nonstandard detection means for detecting whether said video signal is a standard signal or a nonstandard signal;

motion detection means for detecting a motion of a picture by comparing said video signal with a previous frame of said video signal;

first switching means for switching between an output of the 2D Y/C separation means and an output of the 3D Y/C separation means depending on an output of the standard/nonstandard detection means and an output of the motion detection means; and second switching means for connecting said output of the first field memory to the 2D Y/C separation means when a function employing a field memory is requested.

2. A video signal processor comprising:

2D Y/C separation means for performing a 2D Y/C separation between scanning lines for a video signal received as input;

a first field memory having an input for receiving the video signal and an output;

a second field memory having an input for receiving the output from the first field memory and an output;

3D Y/C separation means for performing an interframe 3D Y/C separation using said video signal and the output from the second field memory;

motion detection means for detecting a motion of a picture by comparing said video signal with a previous frame of said video signal;

key input detection means for detecting a key input, wherein the key input detection means detects a request for a function employing a field memory;

first switching means for switching means for switching between an output of the 2D Y/C separation means and an output of the 3D Y/C separation means depending on an output of the motion detection means; and second switching means for connecting said output of the first field memory to the 2D Y/C separation means when the function employing the field memory is requested.

3. A video signal processor as claimed in claim 1, further comprising:

an input terminal to which said video signal is inputted;

a chroma signal output terminal connected to an output of the first switching means;

luminance signal separation means connected to the input terminal and to the first switching means for separating a luminance signal from said video signal; and a luminance signal output terminal connected to an output of the luminance signal separation means.

4. A video signal processor as claimed in claim 1, further comprising:

control means for stopping a writing to the first field memory when the function employing the field memory is requested.

5. A video signal processor as claimed in claim 2, further comprising:

third switching means for preventing said video signal from being input to the first field memory when the nonstandard signal is detected.

6. A video signal processor as claimed in claim 2, further comprising:

third switching means for preventing said video signal from being input to the motion detection means when the function employing the field memory is requested.

7. A video signal processor as claimed in claim 2, further comprising:

control mans for controlling the first switching means; wherein the control means switches the first switching means depending on an output of the key input detection means and an output of the motion detection means.

8. A video signal processor as claimed in claim 1, wherein the 3D Y/C separation means includes a subtractor.

9. A video signal processor as claimed in claim 3, wherein the luminance signal separation means includes a subtractor.

10. A video signal processor as claimed in claim 7, wherein the control means includes an OR circuit.

11. A video signal processor comprising:

a 2D Y/C separator for performing a 2D Y/C separation between scanning lines for a video signal received as input;

a first field memory having an input for receiving the video signal and an output;

a second field memory having an input for receiving the output from the first field memory and an output;

a 3D Y/C separator for performing an interframe 3D Y/C separation based on said video signal and the output from the second field memory;

a signal-type detector circuit for detecting whether said video signal is a standard signal or a nonstandard signal;

a motion detector circuit for detecting a motion of a picture by comparing said video signal with a previous frame of said video signal;

a first switch circuit for switching between an output of the 2D Y/C separator and an output of the 3D Y/C separator depending on an output of the signal-type detector circuit and an output of the motion detector circuit; and a second switch circuit for connecting said output of the first field memory to the 2D Y/C separator when a function employing a field memory is requested.

12. A video signal processor comprising:

a 2D Y/C separator for performing a 2D Y/C separation between scanning lines for a video signal received as input;

a first field memory having an input for receiving the video signal and an output;

a second field memory having an input for receiving the output from the first field memory and an output;

a 3D Y/C separator for performing an interframe 3D Y/C separation based on said video signal and the output from the second field memory;

a signal-type detector circuit for detecting whether said video signal is a standard signal or a nonstandard signal;

a motion detector circuit for detecting a motion of a picture by comparing said video signal with a previous frame of said video signal;

a key input detector circuit for detecting a key input, wherein the key input detector circuit detects a request for a function employing a field memory;

a first switch circuit for switching between an output of the 2D Y/C separator and an output of the 3D Y/C separator depending on an output of the key input detector circuit and an output of the motion detector circuit; and a second switch circuit for connecting said output of the first field memory to the 2D Y/C separator when the function employing the field memory is requested.

13. A video signal processor as claimed in claim 11, further comprising:

an input terminal to which said video signal is inputted;

a chroma signal output terminal connected to an output of the first switch circuit;

a luminance signal separator connected to the input terminal and to the first switch circuit for separating a luminance signal from said video signal; and a luminance signal output terminal connected to an output of the luminance signal separator.

14. A video signal processor as claimed in claim 11, further comprising:

a control circuit for stopping a writing to the first field memory when the function employing the field memory is requested.

15. A video signal processor as claimed in claim 12, further comprising:

a third switch circuit for preventing said video signal from being input to the first field memory when the nonstandard signal is detected by said signal-type detector circuit.

16. A video signal processor as claimed in claim 12, further comprising:

a third switch circuit for preventing said video signal form being input to the motion detector circuit when the function employing the field memory is requested.

17. A video signal processor as claimed in claim 12, further comprising:

a control circuit for controlling the first switch circuit; wherein the control circuit switches the first switch circuit depending on an output of the key input detector circuit and an output of the motion detector circuit.

18. A video signal processor as claimed in claim 11, wherein the 3D Y/C separator includes a subtractor.

19. A video signal processor as claimed in claim 13, wherein the luminance signal separator includes a subtractor.

20. A video signal processor as claimed in claim 17, wherein the control circuit includes an OR circuit.

* * * * *